| United States Patent [19] | [11] B | 4,014,857 |
|---|---|---|
| Schmoyer | [45] | Mar. 29, 1977 |

[54] FLUORINATED OILY SOIL RELEASE AGENTS

[75] Inventor: Ronald W. Schmoyer, Wilmington, Del.

[73] Assignee: E. I. Du Pont de Nemours & Co., Wilmington, Del.

[22] Filed: Dec. 6, 1974

[21] Appl. No.: 530,437

[44] Published under the second Trial Voluntary Protest Program on April 13, 1976 as document No. B 530,437.

[52] U.S. Cl. .......................... 260/67.6 R; 8/115.6; 260/29.4 R; 260/32.8 N; 260/33.2 R; 260/33.6 F; 260/33.8 F; 260/249.6; 260/849; 427/390 E

[51] Int. Cl.$^2$ ......................................... C08G 9/36

[58] Field of Search ...................... 260/67.6 R, 849

[56] References Cited

UNITED STATES PATENTS

| 3,128,272 | 4/1964 | Wear et al. ............... 260/249.6 |
| 3,296,264 | 11/1967 | Gagliardi .................. 260/249.6 |
| 3,488,310 | 1/1970 | McCombs .................... 260/849 |
| 3,503,915 | 5/1970 | Peterson .................... 260/849 |
| 3,510,455 | 5/1970 | Olson ..................... 260/67.6 R |
| 3,894,992 | 7/1975 | Raynolds ................. 260/67.6 R |

FOREIGN PATENTS OR APPLICATIONS 1,233,970   6/1971   United Kingdom

*Primary Examiner*—John C. Bleutge
*Assistant Examiner*—J. Ziegler

[57] ABSTRACT

An adduct prepared from a perfluoroalkyl alcohol; ethylene glycol; at least one polyalkylene glycol such as polyethylene glycol having a molecular weight of up to about 1,000; and a poly(alkoxymethyl)melamine such as hexa(methoxymethyl)melamine. These adducts are effective in promoting anti-snag, oil and water repellency and oily soil release from textiles.

4 Claims, No Drawings

FLUORINATED OILY SOIL RELEASE AGENTS

BACKGROUND OF THE INVENTION

This invention relates to new compositions which, when applied to textiles, confer oil and water repellency and improved washability, and enhance the removal of oily stains.

Textiles are routinely treated to modify their properties. Synthetic fabrics and fabrics composed of blends of natural and synthetic fibers have good strength and resistance to abrasion, as well as good shape retention. Such fabrics are often treated with finishing agents to give them a softer hand. Cotton fabrics normally have a good hand but are often treated to increase fiber resilience and crease resistance.

Fabrics, particularly those containing cotton, are also often treated with thermosetting organic resins to give them permanent press characteristics. In addition to the thermosetting resin, catalysts and various modifying additives or finishing agents such as softeners and antistatic agents are also used to provide suitable commercial fabrics. Many of such treated fabrics have good wearing characteristics but the tendency of the fiber to accept oily stains is increased, and the ability of the material to release such stains upon laundering is usually reduced. While some improvement in staining resistance can be provided through treatment with agents which impart oil and water repellency, a need still exists for a treating agent which can be easily applied and which retains its effectiveness through repeated launderings.

SUMMARY OF THE INVENTION

This invention provides a composition for treating fabrics to give excellent oily stain release on laundering, and which retains its effectiveness after repeated launderings.

Specifically, the present invention provides an adduct prepared by condensing, in the presence of an acid catalyst A. an alcohol of the formula
 1. $R_f(CH_2)_n$-OH
   wherein
   $R_f$ is perfluoroalkyl of from 4 through 16 carbon atoms;
   $n$ is an integer from 1 through about 16;
B. ethylene glycol
C. at least one polyalkylene glycol of the formula
 2. $HO(CH_2\text{-}CHR\text{-}O)_mH$
   wherein R is hydrogen or methyl, and
   $m$ is an integer of from 4 to 450;
   and having a molecular weight of about from 200 to 20,000; and
D. a poly(alkoxymethyl)melamine of the formula

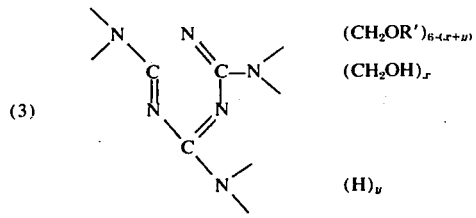

(3)

$(CH_2OR')_{6-(x+y)}$
$(CH_2OH)_x$
$(H)_y$ wherein
R is alkyl of one to 5 carbon atoms;
$x$ has a value of 0 to 2; and
$y$ has a value of 0 to 3 with the limitation that $x + y$ cannot exceed a value of 3;
wherein the equivalents ratio of A to B + C is about from 20/1 to 1/20, the equivalents ratio of A + B + C to D is about from 0.5/1 to 1.5/1, and the equivalents ratio of B to C is about from 10/1 to 1/10.

DESCRIPTION OF THE INVENTION

The adducts of this invention are produced by reacting, under conditions promoting the removal of the alcohol product, an (alkoxymethyl)melamine, a polyfluoroalkyl alcohol, ethylene glycol and at least one polyalkylene glycol.

Alkoxymethylmelamines which can be used in the preparation of the present adducts include the alkyl ethers of trimethylol melamine and hexamethylol melamine. Alkyl groups of from 1 to about 5 carbon atoms can be conveniently employed, chosen according to the ease with which the corresponding alcohol can be removed from the reaction in which the adduct is formed. The preferred melamine derivatives are the hexa(alkoxymethyl)melamines where the alkyl groups have from 1 to 4 carbon atoms, and especially preferred is hexa(methoxymethyl)melamine, which is commercially available.

The ethylene glycol used in the present invention can be of the type readily available through commercial sources. Polyalkylene glycols which can be used in the preparation of the adducts are commercially available in a variety of molecular weights. Both polyethylene glycols and polypropylene glycols are commercially available and can be used in the adducts of the invention in molecular weights of about from 200 to 20,000. It has been found particularly advantageous to use both a higher and a lower molecular weight polyethylene glycol in the adduct preparation. For example, the combined use of polyethylene glycols having molecular weights of 200 and 1000 provides a desirable adduct.

As polyfluoroalcohols, there can be used compounds containing perfluorinated alkyl groups of 4 to 16 carbon atoms of the general formula (1) above. Preferred alcohols are those in which $n$ is from 1 to 4, especially 2, and the perfluoroalkyl groups are straight or branched chain alkyls of 4 to 14 carbons. The most preferred polyfluoroalcohol is $R_f$—$CH_2CH_2$—OH where $R_f$ is a mixture of perfluroinated straight chain alkyl groups of 6–14 carbon atoms with an average molecular weight of 470. These alcohols can be prepared as described in U.S. Pat. Nos. 2,965,659, 3,145,222, 3,171,861 and 3,283,012.

Other polyfluoroalcohols which can be used are those having inert groups between $R_f$ and $(CH_2)_n$. Examples of these are $(CF_3)_2CFO(CF_2CF_2)_mCH_2CH_2OH$, where $m$ is 1 to 8,
$CF_3(CF_2)_7SO_2N(CH_3)CH_2CH_2OH$,
$CF_3(CF_2)_7SO_2N(CH_2CH_3)CH_2CH_2OH$,
$CF_3(CF_2)_3SO_2N(CH_3)CH_2CH(CH_3)OH$,
$C_6F_{13}CH_2CH_2SCH_2CH_2OH$, and $$R_fCN(CH_2)_mOH$$
$$\phantom{R_fC}\underset{R}{\|}$$

where $R_f$ is perfluorinated $C_4$ to $C_{16}$ alkyl,
R is $C_1$ to $C_4$ alkyl and $m$ is 1 to 3.

The products can be prepared using techniques conventional for a condensation reaction. Generally, the dry reactants are charged to a vessel equipped with an agitator and fitted for fractional distillation. Also charged to the vessel is an acidic material serving as a catalyst and optionally a reaction solvent or diluent which maintains fluidity in the mixture but takes no part in the reaction. The inert solvent or diluent can be a mixture of compounds and is chosen not only for its fluidization properties but also for its boiling point, which is preferably about from 50°C. to 150°C. so that it can be distilled or partially distilled from the mixtures after the desired reaction is finished. Particularly preferred are diluents which form azeotropes with the alcohol by-product of the reaction and can thereby facilitate its removal.

The mixture is stirred at reflux temperature and the distillate containing alcohol of reaction removed. When the desired amount of alcohol has been removed, the acidity conferred by the catalyst is neutralized with a base such as sodium bicarbonate or ammonia. Distillation is continued until all of the solvent or diluent has been removed by distillation. Distillation can be carried out at atmospheric pressure or under vacuum.

The product is then dissolved in a water-miscible solvent such as isopropyl alcohol and then diluted with water to the desired concentration.

Materials which can be used as inert diluents in the reaction include hydrocarbons such as benzene, toluene and xylene; halogenated hydrocarbons such as monochlorobenzene, 1,1,2,2,-tetrachloro-1,2-difluoroethane and carbon tetrachloride; and ketones and ethers of suitable boiling point.

Compounds which can be used as reaction catalysts include acidic materials such as p-toluenesulfonic acid, phosphoric acid and even sulfuric or hydrochloric acid if a very small amount is used.

In the reaction of the components to form the adducts, when an alkoxymethylmelamine is heated with an alcohol in the presence of an acid catalyst, an ether interchange reaction occurs with the elimination of the alcohol corresponding to the alkyl group. Such a reaction is described in U.S. Pat. No. 3,296,264. The ethylene glycol and polyalkylene glycols react with alkoxymethylmelamines in the same way, except that each glycol molecule can react with 2 alkoxymethylmelamine molecules instead of one.

The desirable adducts are obtained within the full ranges of ratios of the primary ingredients specified. However, it is preferred to use a slight excess of the alkoxymethylmelamine compound in terms of its reactivity with active hydrogens available in the polyfluoroalcohol and the glycols. In these reactions, a hexa(alkoxymethyl)melamine molecule can react with 6 equivalents of an active hydrogen containing molecule. A glycol molecule can react with 2 equivalents of a compound susceptible to reacting with an active hydrogen, while a polyfluoroalcohol is monoequivalent, offering only one active hydrogen for reaction. Thus for example, 1 mole (6 equivalents) of hexa(methoxymethyl)-melamine can react with 2 moles of a glycol (4 equivalents) plus 2 moles of polyfluoroalcohol (2 equivalents). It is preferred to employ the alkoxymethylmelamine reactant in an approximately stoichiometrically equivalent amount, plus or minus about 10 percent, most preferably with a stoichiometric excess of about 5 percent.

While a very wide range of proportions of polyfluoroalcohol to glycol can be used, it is preferred to employ about 1 to 20 equivalents of the polyfluoroalcohol to 1 equivalent of the combined ethylene glycol and polyalkylene glycols. A particularly desirable mixture for producing an adduct of the invention contains about 5 equivalents of perfluoroalcohol, about 2 equivalents of glycols and about 7.5 equivalents of poly(alkoxymethyl)-melamine.

Reactions which occur in the preparation of the present adducts produce the following types of linkage:

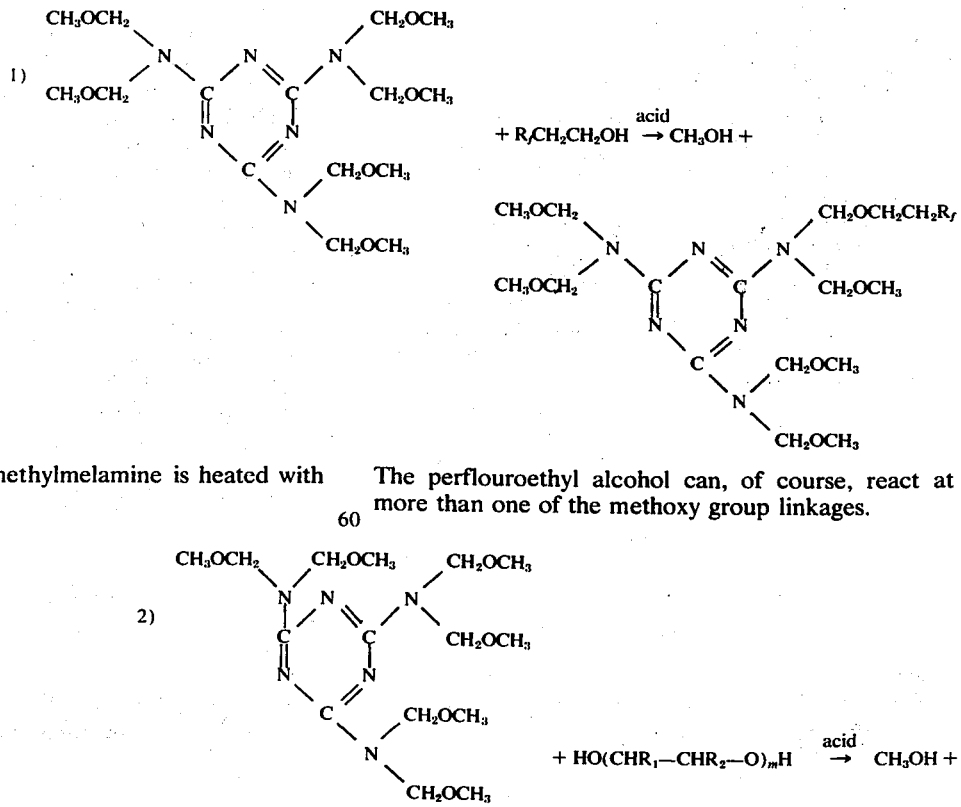

The perflouroethyl alcohol can, of course, react at more than one of the methoxy group linkages.

-continued

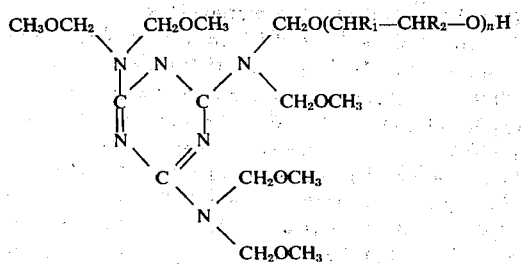

The product of 2) can condense to form

3) 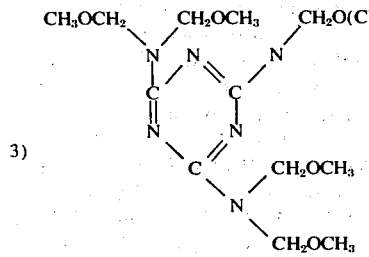 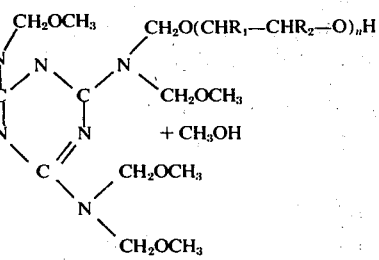 + CH₃OH

In the adducts of the invention most, if not all of the alkoxy groups of the hexa(alkoxymethyl)melamine have reacted so that nearly all have been converted to linkages of the type illustrated in (1), (2), or (3) above.

As shown above, the glycols can react at more than one of the methoxy group linkages. Thus linking of the segments as shown in (3) can occur through reaction of the hydroxy group at the other end of the already linked polyalkylene oxide unit. The products of the reaction include, therefore, a number of molecular species with different proportions of polyfluoroalcohol, ehtylene glycol and polyalkylene glycol substitution on the melamine rings, and varying degrees of linking of the rings through the polyalkylene oxide chains. The polyfluoroalcohol and glycol units do not link with each other under the conditions employed.

The evolution of the alcohol produced by the reactions shown above can be used to monitor the progress of the reaction according to well-known techniques. To attain maximum durability of the present adducts, the condensation reaction is stopped before completion, and preferable at about 75 percent completion. On application to the textile substrate, the reaction is completed during the curing of the adduct.

The adducts produced contain segments terminating in perfluoroalkyl groups. Polyether groups are believed to link some melamine residues. The adducts possess, therefore, qualities of oil and water repellency due to the pendant oleophobic perfluoroalkyl groups, and also hydrophilic properties associated with the polyalkylene oxide chains. When applied to a substrate, as for example a synthetic textile such as a polyester garment or cloth in conjuction with a crease resistant resin, the adducts of this invention improve not only oil and water repellency but also the easy removal by normal laundering procedures of oily stains which are present.

For treating textiles with the adducts of the invention, it is unnecessary to isolate the solid products of the reaction. Because of the aqueous solubility of the adducts of this invention, the improved properties they confer on textile substrates do not have the desired durability unless the adducts are coapplied with a permanent press or crease resistant resin. The adduct and resin can be conveniently coapplied from an aqueous emulsion by dipping the textile material into a bath, by spraying or calendar coating. Solutions of the adducts and resins can also be used. The permanent press or crease resistant resin is accompanied by the usual resin catalyst, usually an acidic material such as zinc nitrate, magnesium chloride, an amine hydrochloride or an organic acid. The treated material is dried at about 120°C., then cured at the prescribed resin curing temperature and time, usually about 165°C. for about 3 to 5 minutes. The resin and adduct are thus fixed to the fabric, and the functional attributes of the adduct persist through a number of launderings.

The permanent press and crease resistant products are useful as textile treating resins and, when properly applied and cured, are fixed durably to textile material. They are broadly described as aminoplast resins. Their use has been largely on textiles composed of polyester-cotton blends and on cotton itself. The adducts of the invention are useful on polyester-cotton blends and on polyester textiles, especially knitted goods. In these fabrics the anti-snag characteristics are particularly apparent. This property has been found to be lacking in in other soil release agents, and its presence in combination with the other desirable qualities of the present adducts is therefore surprising.

The amount of the adduct of the invention usefully deposited on textile material can be about from 0.1 percent to 5.0 percent based on weight of dry fiber. Preferably the amount will be about from 0.2 percent to 2.0 percent. The amount of aminoplast resin coapplied can range about from 0.1 percent to 10.0 percent of the resin based on weight of dry fiber. Since these products are normally sold in a diluted form, usually at 50 percent concentration, the amount of commercial resin formulation used can be much higher. Preferably the amount of actual aminoplast resin codeposited will be about from 0.1 percent to 1.0 percent, as this amount will ordinarily serve to durabilize the properties conferred by the adduct of the invention. Where a crease-proofing treatment is being applied, much larger amounts of crease-proofing resin can be coapplied with the adduct of the invention. Treatment baths can also include other textile treating agents such as softeners, static eliminators and the like.

In addition to the oil and water repellency and soil release properties, the present adducts exhibit desirable anti-snag characteristics. Anti-snag properties have heretofore been difficult to obtain in such adducts. The oil and water repellency, anti-snag and soil release properties obtained by coapplication of the adducts of this invention along with permanent press or crease resistant resins are not shown by textiles treated with the resins only.

The following examples further illustrate the invention. Parts and percentages are by weight unless otherwise indicated.

EXAMPLES 1–3

In Examples 1–3, the following ingredients were changed into a suitable flask equipped with a packed column for fractional distillation. Weights are shown in grams.

| EXAMPLE | 1 | 2 | 3 | |
|---|---|---|---|---|
| Ingredients | | | | |
| $R_fCH_2CH_2OH$ ($R_f$ = mixed perfluoroalkyl of 4 to 14 carbons) | 70 | 70 | 70 | |
| $HO(CH_2CH_2O)_{22}H$ "Carbowax" 1000 | 30 | 30 | 30 | |
| $HO(CH_2CH_2O)_4H$ "Carbowax" 200 | 12.5 | 12.5 | 12.5 | |
| Ethylene glycol | 1.0 | 2.5 | 4.0 | |
| Hexa(methoxymethyl)melamine | 23.8 | 25.4 | 27.1 | |
| Toluene | 390 | 390 | 390 | (Solvent) |
| p-Toluenesulfonic acid | 0.1 | 0.1 | 0.1 | (Catalyst) |

All the materials were dry, and formed clear solutions when mixed.

In each case the charge was heated to boiling temperature, and toluene-methanol azeotrope was collected and measured. The mixture of Example 1 produced 18.5 grams of azeotrope containing 10.2 grams of methanol of reaction. With heat turned off, 20 ml. of 3 percent aqueous sodium bicarbonate solution was added to neutralize the acid catalyst. Substantially all of the toluene was removed by distillation under vacuum, and the residual product was dissolved in 100 ml of isopropyl alcohol, then diluted with 100 ml of water. This product contained 112 grams of adduct and was diluted to 27.0 percent active ingredient with water for testing.

The mixture of Example 2 produced 11.2 grams of methanol and gave 115.7 grams of adduct. It was also diluted to 27 percent active ingredient.

The mixture of Example 3 produced 9.7 grams of methanol and gave 113.0 grams of adduct. It, too, was diluted to 27 percent active ingredient. The three products were applied to two different samples of dyed 100 percent polyester double knit fabric at levels of 0.405 percent and 0.54 percent of adduct on the dry weight of the fabric. They were applied by dipping and wringing from an aqueous bath which also deposited on the fabric 1.0 percent "Aerotex" 23 Special, a melamine-uron crease resistant resin product of American Cyanamid Co., 0.2 percent Catalyst RB, a 32 percent solution of aluminum glycollate containing a little glycollic acid which is a recommended curing catalyst for the resin, and 0.5 percent of a fiber lubricant containing about 23 percent mineral oil, 3.5 percent polyvinyl alcohol and 5 percent of a quaternized cationic surfactant, the remainder being water. The treated cloth samples were dried 4 minutes at 250°F, then cured 1½ minutes at 340°F. They were tested for oil repellency, water repellency, soil release and resistance to snagging.

The Oil Repellency Test used was AATCC Test Method No. 118–1966. The Water Repellency Test used was the Standard Spray Test, AATCC Standard Test Method 22–1964. The Soil Release Test used was the Oil Stain Release Method, AATCC Test No. 130–1970.

Where washes are applied to illustrate the durable character of treatments, they consist of a complete wash and spin dry cycle in a conventional automatic washing machine (Sears-Roebuck "Kenmore" Model 600) using about 18 gallons of water, 90.0 g AATCC detergent No. 124 and a 4 lb. load of textile material. Washing temperature is about 60°C and drying in a home dryer at about 85°C. The designation AATCC refers to the American Association of Textile Chemists and Colorists.

The test for snag resistance is described in the Journal "Research Disclosure" No. 110, June 1973, Item 11003. The Journal is published in Great Britain by Industrial Opportunities Ltd.

Results of the tests are shown in Tables I, II and III. The control is a sample of untreated cloth soaked in water then wrung out, dried and heated at curing temperature as for the test samples.

TABLE I

| | | Oil and Water Repellency | | | | | | | |
|---|---|---|---|---|---|---|---|---|---|
| | | Test Cloth No. 1 | | | | Test Cloth No. 2 | | | |
| | | Initially | | After 5 Home Washes | | Initially | | After 5 Home Washes | |
| Example | Concentration | Oil Rep. | H$_2$O Rep. | Oil Rep. | H$_2$O Rep. | Oil Rep. | H$_2$O Rep. | Oil Rep. | H$_2$O Rep. |
| 1 | 0.405% OWF | 5 | 70 | 4 | 70 | 4 | 70- | 2 | 70 |

TABLE I-continued

| Example | Concentration | Oil and Water Repellency Test Cloth No. 1 Initially | | After 5 Home Washes | | Test Cloth No. 2 Initially | | After 5 Home Washes | |
|---|---|---|---|---|---|---|---|---|---|
| | | Oil Rep. | H₂O Rep. | Oil Rep. | H₂O Rep. | Oil Rep. | H₂O Rep. | Oil Rep. | H₂O Rep. |
| 1 | 0.54% OWF | 6 | 70- | 5 | 70- | 5 | 70- | 3 | 70- |
| 2 | 0.405% OWF | 5 | 70- | 4 | 70 | 4 | 70 | 2 | 70 |
| 2 | 0.54% OWF | 6 | 70- | 5 | 70- | 6 | 70 | 3 | 70 |
| 3 | 0.405% OWF | 5 | 70- | 4 | 70- | 4 | 70- | 2 | 70 |
| 3 | 0.54% OWF | 6 | 70 | 4 | 70- | 6 | 70- | 2 | 70 |
| | Control | 0 | 0 | 0 | 0 | 0 | 0 | 0 | 0 |

TABLE II

| Example | Concentration | Soil Release Initially Test Cloth 1 | | Test Cloth 2 | | After 5 Home Washes Test Cloth 1 | | Test Cloth 2 | |
|---|---|---|---|---|---|---|---|---|---|
| | | Corn Oil | Burnt Motor Oil | Corn Oil | Burnt Motor Oil | Corn Oil | Burnt Motor Oil | Corn Oil | Burnt Motor Oil |
| 1 | 0.405% OWF | 5 | 4 | 5 | 2–3 | 5 | 3–4 | 5 | 2 |
| 1 | 0.54% OWF | 5 | 4 | 5 | 3–4 | 5 | 3–4 | 5 | 3 |
| 2 | 0.405% OWF | 5 | 3–4 | 5 | 2–3 | 5 | 3–4 | 5 | 1–2 |
| 2 | 0.54% OWF | 5 | 4 | 5 | 4 | 5 | 4 | 5 | 2 |
| 3 | 0.405% OWF | 5 | 4 | 5 | 3 | 5 | 4 | 5 | 1–2 |
| 3 | 0.54% OWF | 5 | 4–5 | 5 | 4 | 5 | 3–4 | 5 | 2 |
| | Control | 1–2 | 1 | 1 | 1 | 1 | 1 | 2 | 1 |

TABLE III

| Example | Concentration | Snag Test Test Cloth No. 1 Initial | After 5 Home Washes | Test Cloth No. 2 Initial | After 5 Home Washes |
|---|---|---|---|---|---|
| 1 | 0.405% OWF | 4 | 1 | 1 | 4 |
| 1 | 0.54% OWF | 8 | 8 | 1 | 2 |
| 2 | 0.405% OWF | 6 | 2 | 1 | 2 |
| 2 | 0.54% OWF | 9 | 12 | 0 | 2 |
| 3 | 0.405% OWF | 4 | 1 | 1 | 3 |
| 3 | 0.54% OWF | 6 | 3 | 0 | 2 |
| | Control | 14 | 14 | 15 | 11 |

Claims:

1. An adduct prepared by condensing, in the presence of an acid catalyst and under temperature and pressure conditions that result in the removal of alcohol formed by the condensation of
   A. an alcohol of the formula
      1  $R_f(CH_2)_nOH$ wherein $R_f$ is perfluoroalkyl of from 4 through 16 carbon atoms, and $n$ is an integer from 1 through about 16;
   B. ethylene glycol;
   C. a polyalkylene glycol of the formula
      2  $HO(CH_2\text{-}CHR\text{-}O)_mH$
      wherein R is hydrogen or methyl;
      and $m$ is an integer of about from 4 to 450;
      and having a molecular weight of about from 200 to 20,000; and
   D. at least one poly(alkoxymethyl)melamine of the formula

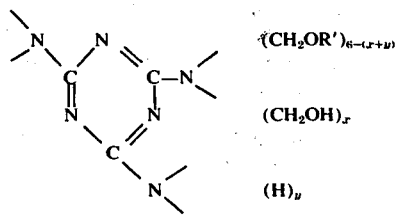

wherein
   R' is alkyl of 1 to 5 carbon atoms;
   $x$ has a value of 0 to 2; and
   $y$ has a value of 0 to 3 with the limitation that $x + y$ cannot exceed a value of 3; wherein the equivalents ratio of A to B + C is about from 1/20 to 20/1, the equivalents ratio of A + B + C to D is about from 0.5/1 to 1.5/1, and the equivalents ratio of B to C is about from 10/1 to 1/10.

2. An adduct of claim 1 wherein the poly(alkoxymethyl)melamine is hexa(methoxymethyl)melamine.

3. An adduct of claim 2 wherein the alcohol has the formula $R_f\text{-CH}_2\text{CH}_2\text{-OH}$ and $R_f$ is perfluoroalkyl of from 4 to 14 carbon atoms.

4. An adduct of claim 1 prepared from two polyethylene glycols having molecular weights of about 200 and 1000, respectively.

* * * * *